Feb. 6, 1934.　　　F. I. MARSHALL　　　1,946,087
BRAKE TESTING MACHINE
Filed May 9, 1928　　　2 Sheets-Sheet 1

INVENTOR
Furber I. Marshall
BY
ATTORNEY

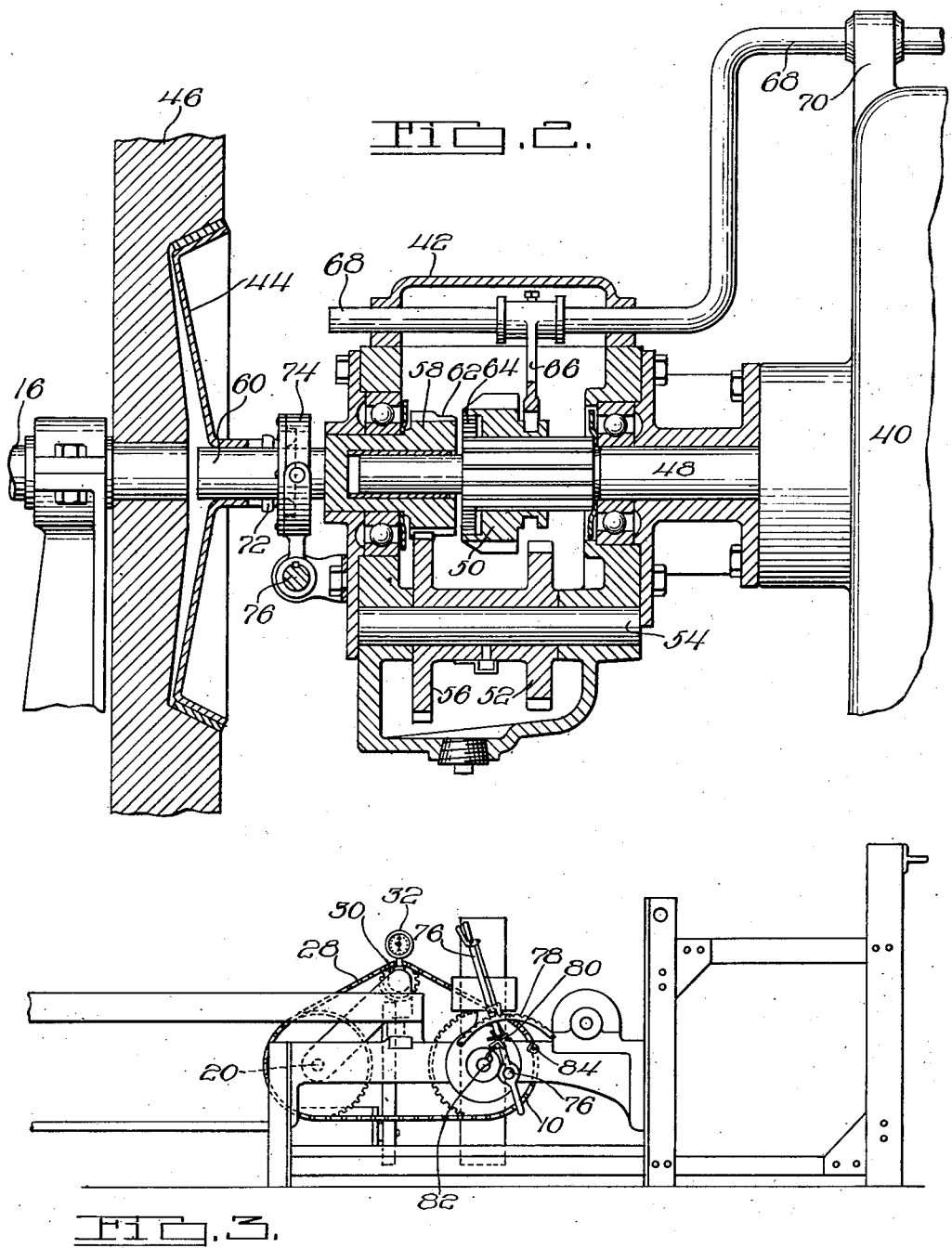

Patented Feb. 6, 1934

1,946,087

UNITED STATES PATENT OFFICE 1,946,087

BRAKE TESTING MACHINE

Furber I. Marshall, Chicago, Ill., assignor, by mesne assignments, to Bendix-Cowdrey Brake Tester, Inc., New York, N. Y., a corporation of Delaware Application May 9, 1928. Serial No. 276,294

6 Claims. (Cl. 265—25)

This invention relates to the testing of brakes, and is illustrated as embodied in a machine for testing a set of four-wheel brakes for an automobile. An object of the invention is to improve the machine by providing for making different kinds of tests of the same brakes.

Having this object in mind, I prefer to arrange the machine so that it has one device, such as a torsion dynamometer, measuring the effectiveness of the brake, preferably at a relatively low speed, while a different device such as an inertia dynamometer can also be used, preferably at a relatively high speed. The illustrated machine has a change-speed transmission through which the two testing devices are driven from the same source of power.

According to one important phase of the invention, the one testing means operates to determine the effectiveness of the four brakes separately, while the other (preferably the inertia device) operates to determine the effectiveness of the entire system,—i. e. it determines the combined effectiveness of the four brakes acting jointly, this being the same in effect as the retarding force of the entire brake system on the road.

The above and other objects and features of the invention, including certain novel constructions embodied in the inertia testing means, and other novel and desirable details of construction, will be apparent from the following description of one illustrative embodiment shown in the accompanying drawings, in which:

Figure 2 is a partial section through the driving mechanism; and

Figure 3 is a side elevation of the front end of the machine, looking in the direction of the arrows 3—3 of Figure 1.

Figure 1:
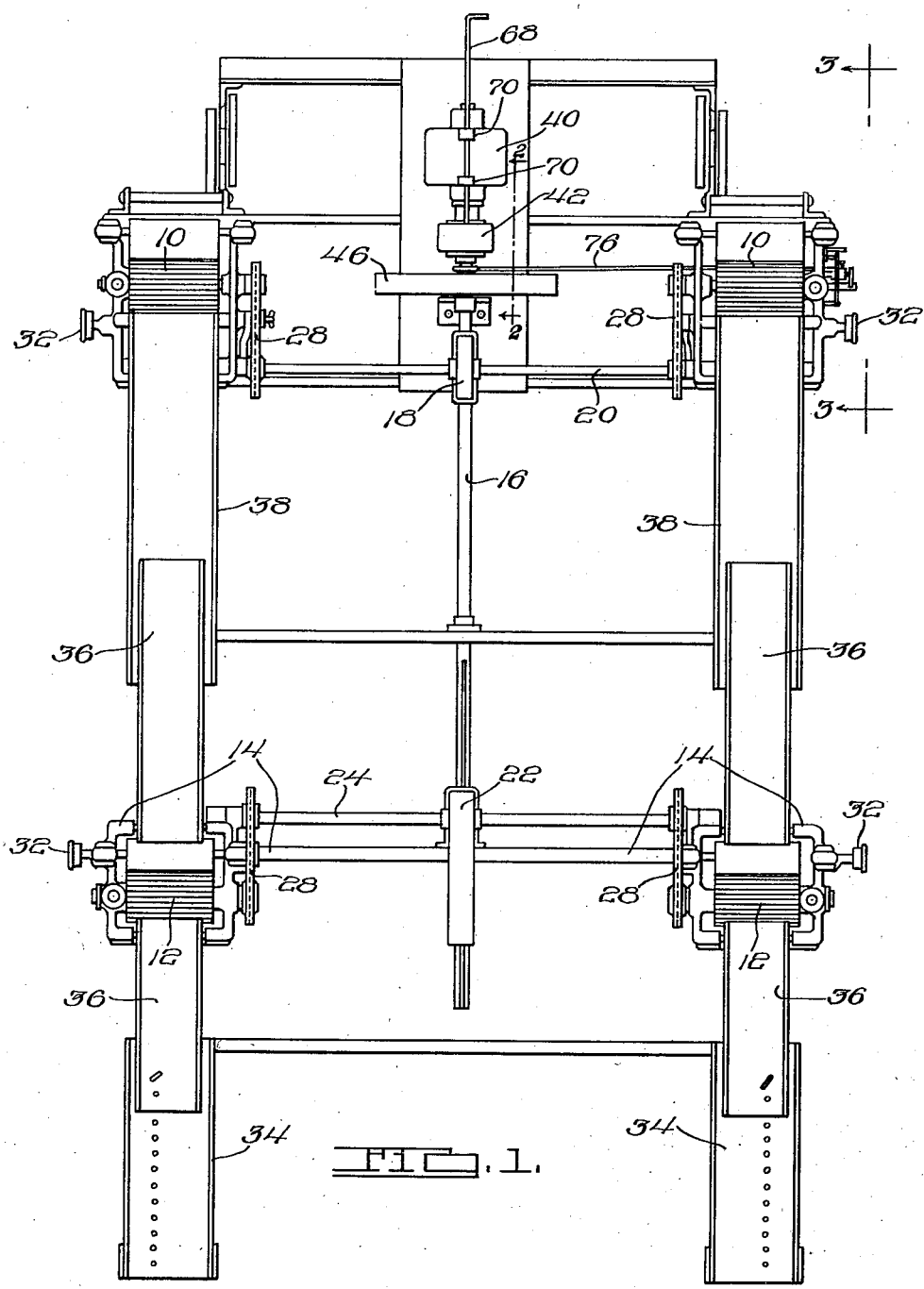
Figure 1 is a top plan view of the machine.

The illustrated machine includes drive rollers 10 for the front wheels of an automobile, and rollers 12 for the rear wheels, the automobile being chained or otherwise fixed in place on the rollers. Rollers 12 are carried by a suitable movable carriage 14, to adjust the machine for automobiles of different wheel bases.

The four rollers 10 and 12 are all driven from a single central longitudinal shaft 16, connected by a suitable worm-and-gear unit 18 with a front cross-shaft 20, and splined to a similar unit 22 for a rear cross-shaft 24 on the carriage 14. Each of the shafts 20 and 24 has at its ends two sprockets driving sprocket chains 28 driving sprockets on the rollers 10 and 12. Chains 28 pass over idlers 30 which are moved by tension on the chains, caused by the resistance of the brakes, to rock transverse levers operating spring-scale type indicators 32, one for each wheel, the whole constituting in effect a torsion dynamometer in the driving connections for each wheel.

The car is driven onto the machine over fixed tracks or ways 34, then over movable ways 36 on the carriage 14, and then over fixed ways 38, until the front wheels rest on rollers 10 and the rear wheels on rollers 12. In this position, it will be seen that the driving of the four wheels by shaft 16 against the resistance of the corresponding brakes will cause the effectiveness of the brakes to be shown on the indicators 32.

The parts of the machine described above are substantially as more fully disclosed in application No. 270,192, filed April 16, 1928, by Otto Darrel Du Bois.

Shaft 16 is driven, to operate the machine, by a source of power such as an electric motor 40, acting through a two-speed transmission 42 and a cone clutch 44. Clutch 44 is shown as engaging a flywheel 46, forming the inertia mass of the second testing device. Ordinarily, in the transmission, shaft 48 from motor 40 drives a gear 50 splined thereon and which meshes with and drives a gear 52 forming part of a gear unit rotatably mounted on a fixed countershaft 54. A second gear 56, rotating with gear 52, is constantly in mesh with a gear 58 on the driven shaft 60. Shaft 60 has an axial recess in its end, in which a reduced end portion of shaft 48 is rotatably piloted or journaled. Gear 58 has external clutch teeth 62 at its right end, for meshing with internal teeth 64 on gear 50, to give direct high-speed drive when gear 50 is shifted to the left, out of mesh with gear 52 by a shifter fork 66 operated by a lengthwise-movable rod 68 slidably supported by sliding bearings 70, and extending to an accessible position at the front of the machine. This gives the desired two (high and low) speeds at the wish of the operator.

The cone clutch 44 is keyed to shaft 60, by means such as a cross pin 72 entering a slot in the hub of the clutch, and is operated by a yoke device 74 on a shaft 76 extending to one side of the machine, and there provided with hand operating lever 76, preferably provided with a locking ratchet 78. Lever 78 carries a counter 80, or the like, having a star wheel operated one-fourth turn at each revolution of the shaft of one roller 10 by a finger 82 on the shaft. When the lever is in the position of Figure 3, with the clutch thrown out and with the shaft 16 disconnected from the motor, the counter 80 engages a fixed stop 84 which resets it to zero. I do not illustrate the counter in detail, as any of the ordinary commercial counters may be used.

In operation, with a car in place on the machine and with the clutch thrown in and the gear 50 in mesh with gear 52, the machine is operated to drive the four wheels against the resistance of their four brakes, the effectiveness of the brakes being shown on the indicators 32. Any desired adjustments of the brakes may then be made.

Gear 50 is next shifted into the direct-drive high-speed position, and, with the brakes released, the wheels are speeded up by the rolls 10 and 12, until the speedometer of the car shows the desired speed, as for example 20 miles per hour. The operator of the car then applies the brakes, and just as he does so the operator of the machine throws lever 76 rearwardly, to throw out the clutch and move the counter or indicator 80 to active position. The fly-wheel 46 at this time has a very considerable inertia, and resists the stopping of the wheels by the brakes. If the fly-wheel is made heavy enough, the wheels will be stopped by the brakes at the same rate as on the road; if a light flywheel is used it will stop sooner but in proportion to the retarding effect on the road.

Counter or indicator 80 may be graduated and calibrated to show the stopping distance of the car from the indicated speed, in feet of road surface, the calibration being preferably checked from time to time in actual tests on a dry concrete road. It should be especially noted that indicator or counter 80 shows the combined effect of the four brakes acting jointly, as a system instead of individually as on the first test.

While one illustrative embodiment has been described in detail, it is not my intention to limit the scope of the invention to that particular embodiment, or otherwise than by the terms of the appended claims.

I claim:

1. A vehicle brake-testing machine comprising, in combination, supports for the four wheels of an automobile, means movable by torque reaction associated with said supports for testing simultaneously the individual effectiveness of the several brakes associated with said wheels, and inertia means independently associated with said supports for testing the combined effectiveness of these same brakes acting jointly.

2. A vehicle brake-testing machine comprising, in combination, means for turning the four wheels of a motor vehicle against the resistance of the brakes, and two indicating means independently associated therewith and operated thereby, one of which is operated by torque reaction to show the individual effectiveness of the brakes, and the other of which shows the combined effectiveness of the same brakes.

3. A vehicle brake-testing machine comprising, in combination, means for turning the four wheels of a motor vehicle against the resistance of their brakes, and two indicating means independently associated therewith and operated thereby, one of which includes a separate device movable by torque reaction for each brake and which shows the individual effectiveness of the brakes and the other of which includes a single device showing the combined effectiveness of the same brakes.

4. A vehicle brake-testing machine comprising, in combination, a source of power, inertia means operated thereby for turning a wheel of the vehicle against the resistance of its brake, and driving connections from said source to said means including a clutch and a selective speed-changing transmission, together with torque reaction indicating means for showing the effectiveness of the brake when the clutch is engaged and a different indicating means showing the effectiveness of the brake when the clutch is disengaged and absorbing the kinetic energy of said inertia means.

5. A brake-testing machine comprising, a rotary support for the wheels of a vehicle, a power source, an endless transmission member connecting the power source and the rotary support, a yieldable element engaging the driving portion of the transmission member, means for indicating movement of the yieldable member, means for disconnecting the power source, and means for indicating total movement of the rotary support after the power source has been disconnected.

6. A brake-testing machine comprising means for driving the four wheels of a vehicle, said means including a yieldable element for each wheel adapted to be moved in accordance with the driving torque, inertia means for turning the four wheels when the driving means is disconnected from the wheels, and means for indicating the movement of the inertia means after disconnection of the driving means.

FURBER I. MARSHALL.